United States Patent [19]

Gonda

[11] Patent Number: 4,865,374
[45] Date of Patent: Sep. 12, 1989

[54] DOUBLE HOOK LOGGING CHAIN ASSEMBLY

[76] Inventor: Walter S. Gonda, 8105 Glaser La., Louisville, Ky. 40291

[21] Appl. No.: 190,418

[22] Filed: May 5, 1988

[51] Int. Cl.$^4$ .............................................. B66C 1/36
[52] U.S. Cl. ........................ 294/82.23; 24/230.5 AD
[58] Field of Search ................ 294/82.1, 82.14, 82.17, 294/82.21, 82.23, 82.13; 24/230.5 A, 230.5 AD, 241 SL, 238, 239

[56] References Cited

U.S. PATENT DOCUMENTS

| | | | |
|---|---|---|---|
| 769,333 | 9/1904 | Aubrey | 24/230.5 R |
| 1,523,765 | 1/1925 | Gilchrist | 24/241.56 |
| 1,744,538 | 1/1930 | Frazier | 24/230.5 AD |
| 1,758,744 | 5/1930 | Haubert | 24/230.5 R |
| 2,244,572 | 6/1941 | Rawlins | 24/230.5 R |
| 3,002,780 | 10/1961 | Eggeman | 294/74 |
| 3,233,933 | 2/1966 | Coski | 24/116 |
| 3,601,978 | 8/1971 | Rieger et al. | 294/82.1 |
| 3,747,971 | 7/1973 | Yake | 24/230.5 R |
| 4,149,369 | 4/1979 | Smetz | 294/82.1 |
| 4,257,638 | 3/1981 | Koval | 294/82.1 |

*Primary Examiner*—Dennis H. Pedder
*Assistant Examiner*—Frank H. Williams, Jr.
*Attorney, Agent, or Firm*—William R. Price

[57] ABSTRACT

A double chain hook assembly includes a first hook and a second hook, each having a bill and throat portion and a common shank, which is bifurcated at its upper end. The bifurcation produces two projecting legs, having a bight at one end and a throat at the other. Each of the legs has a bore near the top in registry with the bore in the other leg. A closure includes a bolt, slidably fastened in the two bores, so as to selectively close the throats of both hooks or of either hook, as desired. A biased ball latch selectively positions the bolt.

13 Claims, 2 Drawing Sheets

DOUBLE HOOK LOGGING CHAIN ASSEMBLY

FIELD OF THE INVENTION

This invention relates to logging chain hooks and more specifically relates to the provision of a double chain hook, which is used either as a "grab hook" or a "choker hook." More specifically, this invention relates to a double chain hook assembly, having a common shaft, which is bifurcated to form two projecting legs, each containing a bore in which a slidable closure member can be mounted to selectively open or close the throats of one or both of the hooks.

DESCRIPTION OF THE PRIOR ART

The prior art of which applicant is aware is as follows:
U.S. Pat. No. 1,523,765—Gilchrist—1925
  Provides a locking latch for a safety butt hook.
U.S. Pat. No. 769,333—Aubrey—1904
  Provides a double logging hook, in which the hooks are located at opposite ends of a common shank.
U.S. Pat. No. 1,744,538—Frazier—1930
  Provides a multiple-bill hook, for use by loggers, which allows a single hook to take the place of two separate hooks.
U.S. Pat. No. 2,244,572—Rawlins—1941
  Provides a double chain hook, in which the hooks are disposed at either end of a common shank.
U.S. Pat. No. 1,758,744—Haubert—1930
  Discloses a chain hook, having a link-receiving bifurcation at approximately right angles to the plane of the bight portion.
U.S. Pat. No. 3,002,780—Eggeman—1961
  Provides an improved hook and sling, adapted to form an endless loop, from a wire rope or flexible cable.
U.S. Pat. No. 3,233,933—Coski—1966
  Provides a twin-prong chain hook, which can be used either as a grab hook or a choker hook.
U.S. Pat. No. 3,747,971—Yake—1973
  Provides a chain hook assembly, comprising a hook with a shank having a hole and a second hook having a shank containing two holes and a common link interconnecting the two hooks.

Coski, in U.S. Pat. No. 3,233,933, characterizes grab hooks and choker hooks as follows:

"'Grab hooks' are characterized by a single arcuate prong or tine and a relatively narrow throat. The throat is sized to receive and accommodate the narrow transverse dimension of a chain link, but to prevent passage therethrough of the wider transverse dimension of the next chain link. In use, the conventional 'grab hook' is attached to a chain by engaging a link of such chain sideways in the hook throat."

"A 'choker hook,' as herein defined, is a hook having an enlarged throat of sufficient size to loosely accommodate even the wider transverse dimension of the links of the chain with which it is employed. In use, a choker hook' is engaged sideways over a section of the chain and may be allowed to slide relative to the chain, in similar fashion as a slip knot slides relative to a rope."

SUMMARY OF THE INVENTION

According to this invention, a double-bill chain hook assembly is provided, either in the form of a "grab" or "choker" hook, which has a positive locking means, to prevent the chain from becoming disengaged from the hook. This is accomplished by means of a common shank, bifurcated near the top to produce two projecting legs, each containing a bore, into which is mounted a slidable closure member. The slidable closure member is in the form of a bolt and has a latching means, preferably spring loaded, to positively and selectively position the bolt in open or closed position, relative to one or both of the throats of the two hooks.

DESCRIPTION OF THE PREFERRED EMBODIMENT

As previously mentioned, this invention is applicable to double logging hooks of both the "grab" and "choker" types. This invention, however, provides for a positive and selective closure of one or both of the hooks.

Figure 1:
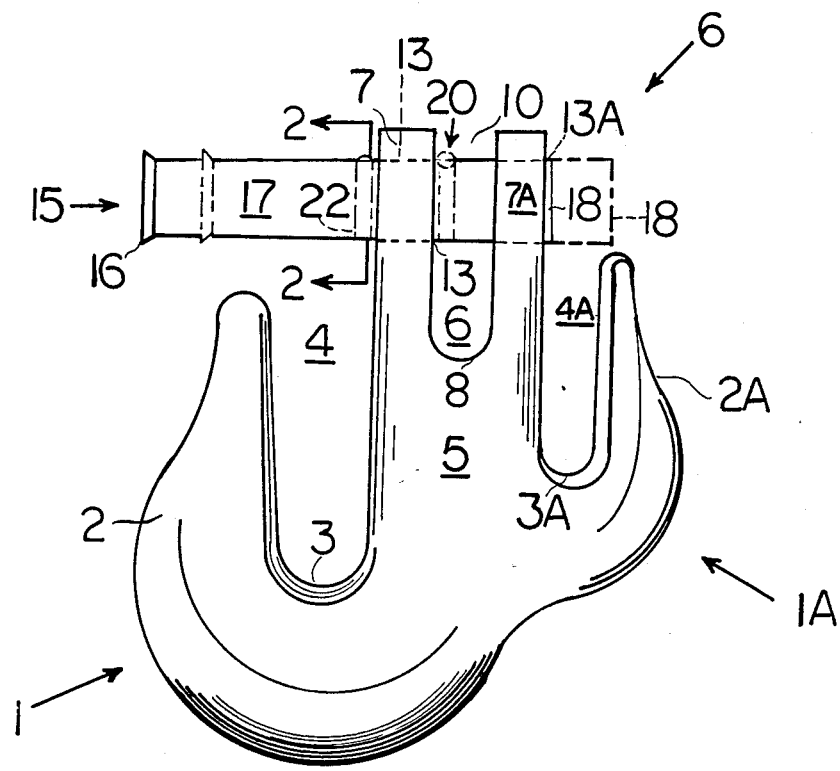
FIG. 1 is a side elevation of the double logging hook of this invention.
Figure 2:
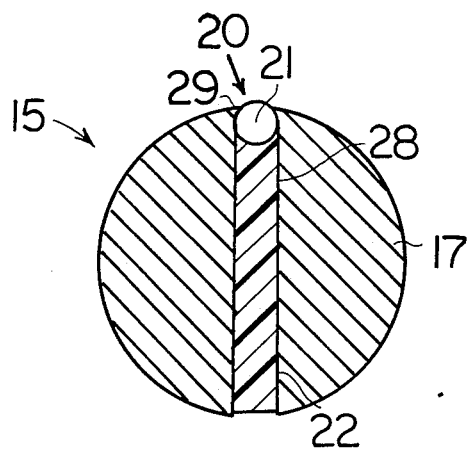
FIG. 2 is an enlarged sectional view, taken along lines 2—2 of FIG. 1.

Referring now to the drawings, FIG. 1 illustrates a "grab" hook of the general type previously described. This is a double chain logging hook and is characterized by hooks 1 and 1A, having a common shank 5.

Figure 3:
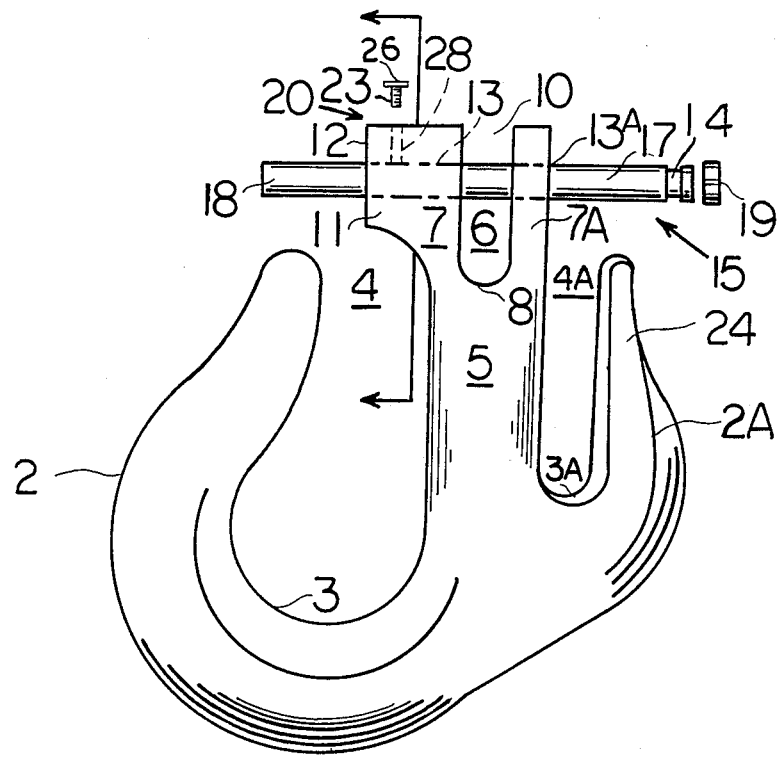
FIG. 3 is a side elevation, showing an improved double logging hook and a different arrangement of the latch for the slidable bolt.
Figure 4:
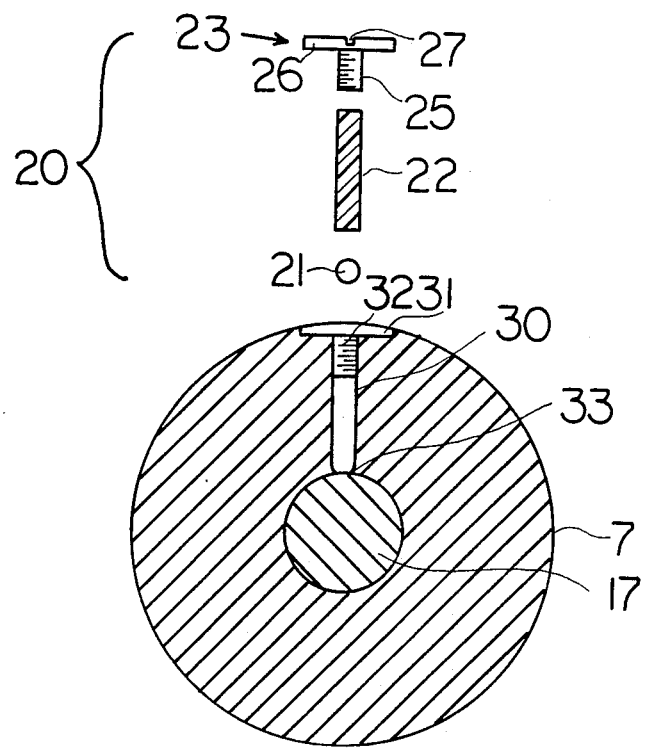
FIG. 4 is an enlarged sectional view, taken along lines 4—4 of FIG. 3, with some parts removed for clarity of illustration.

The first hook is designated by numeral 1, while the second is designated numeral 1A. Each of the hooks has a bill 2 and 2A, which are generally parallel with each other and each of the bills forms a bight 3 and 3A, with the common shank 5. The distance between bill 2 and 2A and the shaft 5 forms a throat 4 and 4A. As will be indicated, the shank 5 is split at the top, forming a bifurcation 6 and two legs 7 and 7A, respectively. Bight 8 is at the bottom of the leg and throat 10 is at the opening at the top. A first bore 13 is formed at the top of leg 7 and the corresponding bore 13A is formed at the top of leg 7A. Both bores 13 and 13A are in registry with each other, so as to accept bolt 15, which is slidably fitted in bores 13 and 13A. In the embodiment of FIG. 1, the end of the bolt 15 has a flange 16 and a shank 17 and an end 18. In FIG. 3, flange 16 has been replaced by a steel locking ring 19 which fits in groove 14 of shank 17. Ring 19 is illustrated separately to the right of shank 17 for clarity of illustration. A latch 20, consisting of ball bearing 21 and resilient member 22, in the form of a cylinder of neoprene, is mounted in bore 28, which extends transversely across the shank 17 of bolt 15. As is shown in the drawings, the bolt 15, shown in full lines, is pulled back to open throat 4A of hook 2A. At that position, the ball bearing 21 extends past the restricted orifice 29 of bore 28, to engage with the edge of leg 7. After a chain has been fitted through throat 4A of hook 2A, the bolt can be pushed to the right, as is shown in phantom lines, so that the ball bearing at this point, shown in phantom lines, is on the right side of leg 7.

In a preferred embodiment, it is possible to attach the link of the chain so that the bolt 15 extends therethrough and the first link is located between legs 13 and 13A, with the remainder of the chain falling into the throat 4A, near the bight 3A of hook 2A. By pushing the belt, then, to the right, as shown in phantom lines, the chain is tightly anchored, both by bolt 15 in the closed throat 10 of the bifurcation 6, as well as by the bill 2A and common shank 5 of the hook.

To load a chain into the hook 2, it again can be anchored by bolt 15 in the bifurcation 6 and fitted into the throat 4 of hook 1 between bill 2 and shank 5.

There is provided, therefore, a method of positively using this hook as a grabber hook, with the first chain positively locked to the bolt 15 and the throats 4 or 4A being positively closed by the positioning of bolt 15. Additionally, it is possible to arrange the throats 4 and 4A to be of different sizes, so that the hook 1, for example, has a throat 4 wide enough to accommodate a ½-inch chain and throat 4A of hook 1A be of sufficient size to accommodate a ¼-inch chain.

While a piece of neoprene has been shown as the biasing member for the latch 20, it is possible to use other resilient plastics, or to utilize a spring. The neoprene is preferred, however, since it will not rust and is not adversely affected by grease, gasoline or chemicals, which may be encountered in usage.

The choker hook 4 is marked similarly to FIG. 1, so that the hook on the left is designated as 1 and the hook on the right is marked 1A. Additionally, the bill for hook 1 is designated by 2 and the bill for hook 1A is designated by 2A. The common shank 5 contains a bifurcation 6, forming leg 7 and corresponding leg 7A.

Additionally, the shank 5 contains a bifurcation 6, forming legs 7 and 7A, bight 8 and throat 10. The top of leg 7 is thickened, as shown at 11, to terminate in a flat, planar surface 12 of leg 7. Legs 7 and 7A contain a bore 13 and 13A, as in FIG. 1 for reception of the bolt 15, slidably fitted in bores 13 and 13A. Bolt 15 contains a locking ring 19, a shank 17 and end 18. In this case, however, latch 20 is fitted into a bore 30, which extends at right angles to bore 13 and is in communication therewith. The bore contains a recess 31 at its top portion and a restricted orifice 33 at its bottom portion, to hold the ball bearing 21 of latch 20 from falling out of the bore 30. Additionally, a resilient member, in the form of a neoprene cylinder 22, is fitted into bore 30 and bore 30 is threaded by threads 32 at its upper end to accept the threads 25 of set screw 23. Additionally, the recess 31 accepts the head 26 of the set screw 23. The head of the set screw contains a slot 27 for reception of a screwdriver or other instrument. It is not absolutely necessary to have the restricted orifice 29 in bore 30, since the bolt 15, slidably fitted in the bores 13 and 13A of legs 7 and 7A, respectively, will prevent the ball bearing from falling out. Nevertheless, in some cases, the bolt may be removed and the ball bearing lost, unless a restricted orifice 29 is provided.

In this instance, the first link of the chain will be fitted into the throat 10 of the bifurcation 6 and held in place by the bolt. Thereafter, the chain will be fitted into hook 1 or 2, as desired, forming a loop, which can be used to grab a large rose bush or other plant which it is desired to pull out of the ground. The loop, therefore, is threaded through the throat 4 or 4A of the first or second hook, and is positively held therein by positioning of the bolt 15 over the throat 4 or 4A. Sufficient tension can be placed on the ball bearing forming the latch member, against the bolt, by tightening of the set screw 23 against the biasing member 22.

As previously mentioned, the biasing member is preferably neoprene, but can be in the form of other resilient polymeric materials or in the form of a spring. Neoprene is desired, however, because it will not rust and because of its stable chemical characteristics.

As previously mentioned also, hooks 1 and 1A can be of different sizes, to accommodate different size chains.

The embodiments shown are exemplary in nature and are meant to be nonlimiting, except so as to be commensurate in scope with the appended claims.

I claim:

1. A double chain hook assembly comprising:
   A. a first hook, having a bill and a throat portion;
   B. a second hook, having a bill and a throat portion;
   C. a shank common to said first and second hook, which includes:
      1. a bifurcation at its upper end, forming:
         a. two projecting legs;
         b. a bight between said projecting legs;
         c. a throat portion at the top of said projecting legs; and
         d. a bore near the top of each of said projecting legs, in registry with each other and at a level closely above the top of the bills of said first and second hooks;
   D. the bill of said first hook pointing in the opposite direction to the bill of said second hook and being disposed at 180° relative to the bill of said second hook;
   E. the throat portion of said first and second hooks and said shank being in spaced and adjacent relation;
   F. a closure for selectively opening and closing the throats of said hooks with which includes:
      1. a bolt, sufficiently long to be slidably mounted in the bore of each of said projecting legs and extending outwardly to close the throat portion of at least one hook;
      2. latch means for positively locking said bolt in position.

2. A double chain hook assembly, as defined in claim 1, in which said latch means include:
   A. a ball bearing and biasing means, in operative relation with the projecting leg and the slidable bolt.

3. A double chain hook assembly, as defined in claim 1, in which:
   A. said slidable bolt contains a bore extending transversely across the shank of the bolt and in which said latch means comprises:
   B. a ball bearing and biasing means, mounted in said bore.

4. A double chain hook assembly, as defined in claim 3, in which the bore in the shank of said bolt has a restricted orifice at one end, so as to allow the ball bearing to extend outward of the shank, but which prevents the ball bearing from falling out of the bore.

5. A double chain hook assembly, as defined in claim 3, in which said biasing means is in the form of a cylinder of resilient polymer material.

6. A double chain hook assembly, as defined in claim 2, in which said biasing means is a cylinder of neoprene rubber.

7. A double chain hook assembly, as defined in claim 2, in which said biasing means is a spring.

8. A double chain hook assembly, as defined in claim 1, in which:
   A. at least one of said projecting legs contains a first bore extending at right angles to and which is in communication with the bore in which said slidable bolt is mounted, and B. said latch means is mounted in said first bore, in operative relation with said slidable bolt.

9. A double chain hook assembly, as defined in claim 8, in which said latch comprises a ball bearing and biasing means mounted in said first bore.

10. A double chain hook assembly, as defined in claim 9, in which said biasing means is a cylinder of resilient polymeric material.

11. A double chain hook assembly, as defined in claim 9, in which said biasing means is a cylinder of neoprene.

12. A double chain hook assembly, as defined in claim 8, in which said first bore is threaded at the top, in combination with a set screw threadably fitted into said first bore.

13. A double chain hook assembly, as defined in claim 12, in which said first bore in said projecting leg contains a recess, for provision of the head of said set screw.

* * * * *